(12) United States Patent
Choi et al.

(10) Patent No.: US 7,558,006 B2
(45) Date of Patent: Jul. 7, 2009

(54) LAMINATED LENS

(75) Inventors: Soon Cheol Choi, Kyunggi-Do (KR);
Chang Seong Jegal, Kyunggi-Do (KR);
Mi Young Kim, Kyunggi-Do (KR)

(73) Assignee: Sekonix Co., Ltd., Kyunggi-Do (KR)

( * ) Notice: Subject to any disclaimer, the term of this patent is extended or adjusted under 35 U.S.C. 154(b) by 32 days.

(21) Appl. No.: 11/775,731

(22) Filed: Jul. 10, 2007

(65) Prior Publication Data

US 2008/0174885 A1   Jul. 24, 2008

(30) Foreign Application Priority Data

Jan. 23, 2007   (KR) ...................... 10-2007-0007256

(51) Int. Cl.
*G02B 3/02*   (2006.01)
*G02B 9/14*   (2006.01)
*G02B 9/12*   (2006.01)

(52) U.S. Cl. .................. 359/716; 359/786; 359/785

(58) Field of Classification Search ............ 65/385, 65/406, 407; 359/716, 784, 785, 786, 796; 451/42

See application file for complete search history.

(56) References Cited

U.S. PATENT DOCUMENTS

| 404,506 | A | * | 6/1889 | Schroder | 359/796 |
|---|---|---|---|---|---|
| 1,637,917 | A | * | 8/1927 | Richter | 359/796 |
| 2,140,410 | A | * | 12/1938 | Titmus | 351/159 |
| 2,854,889 | A | * | 10/1958 | Brendel | 359/786 |
| 4,123,144 | A | * | 10/1978 | Mandler et al. | 359/777 |
| 6,441,971 | B2 | * | 8/2002 | Ning | 359/739 |
| 6,728,047 | B2 | * | 4/2004 | Sato et al. | 359/786 |
| 7,154,681 | B2 | * | 12/2006 | Choi et al. | 359/716 |
| 7,436,603 | B2 | * | 10/2008 | Huang et al. | 359/716 |

* cited by examiner

*Primary Examiner*—David N Spector
(74) *Attorney, Agent, or Firm*—Edell, Shapiro & Finnan, LLC

(57) ABSTRACT

Disclosed is a high-definition imaging lens assembly that can reduce the length of an optical path. The high-definition imaging lens assembly includes: first, second, third, and fourth lenses that are sequentially disposed from an object along an optical axis, wherein the first lens has positive refractive power and the second lens has negative refractive power, the first and second lenses are made of optical glass, a front surface of the first lens and a rear surface of the second lens are spherical, and a rear surface of the first lens and a front surface of the second lens that are substantially planar are bonded to each other. The third and fourth lenses are made of plastic and are spaced each other and at least one surface of each of the third and fourth lenses is aspherical.

10 Claims, 4 Drawing Sheets

LAMINATED LENS

CROSS REFERENCE TO RELATED APPLICATIONS

This application claims priority under 35 U.S.C. §119 to Application No. KR 10-2007-0007256 filed on Jan. 23, 2007, entitled "Laminated Lens," the entire contents of which are hereby incorporated by reference.

FIELD OF THE INVENTION

The present invention relates to an imaging lens assembly that is used in a small-sized camera that uses a charged coupled device (CCD) or a complementary metal oxide semiconductor (CMOS). More particularly, the present invention relates to a high-definition imaging lens assembly that includes four lenses.

BACKGROUND

As mobile phones have been increasingly used and it has been required to various services, such as photography or image transmission and communication, functions and services of the mobile phones have been developed. In recent years, a mobile phone of a new concept that is extended by merging a digital camera technology and a mobile phone technology. Further, it has been tried to develop a mobile phone that can store and transmit moving picture.

There is a great demand for a digital camera and a PC camera as well as the mobile phone. These kinds of cameras are small and use the CCD and the CMOS. The present invention relates to small and high-definition imaging lens and lens assembly that can be applied to the small-sized camera.

Although a spherical lens has been manufactured for a long time, a fundamental processing principle of the spherical lens has not changed. A common process of manufacturing optical glass is as follows:

1) obtaining a bulk material (blank) from an optical glass manufacturer;
2) grinding a lens at a high speed to be slightly larger and similar to the designed shape (curve generation or rough shaping process);
3) grinding the lens roughly (grinding process);
4) polishing the lens such that the surface roughness of the lens becomes about several nanometers (polishing process);
5) accurately processing the lens so as to the concentricity of diameter of the lens be the same as a designed value (centering process); and
6) cleaning the lens and perform a necessary optical coating process.

Restrictions have existed in manufacturing a small-sized lens, because the above-mentioned processes are required. In particular, if the thickness of the lens is not about 0.4 mm or more, the lens may be damaged during the manufacture process, and thus it is very difficult to manufacture a small-sized lens.

Further, in regard to the thickness of the lens, it is required to consider both the thickness at center area and the thickness at the outermost side area. That is, there are restrictions in outermost side thickness of a convex lens and in the central thickness of a concave lens.

Further, the diameter of the lens needs to be Φ2 mm or more due to limitations in the process.

As described above, a spherical lens that is made of optical glass is strictly limited. In particular, in the case of an imaging lens for a camera phone that needs a small-sized microlens, there are critical restrictions in the length of an optical path of the lens assembly.

It is preferable that a small-sized lens suitable for a high definition imaging include two optical glass lenses and two plastic lenses. This type of lens assembly has an advantage of correcting color aberration by differing a refractive index and an abbe number of the optical glass lens from those of the plastic lens. However, this type of conventional lens assembly has a disadvantage in that the length of an optical path is increased due to the thickness of the two optical glass lenses, and it is difficult to decrease the size of the lens assembly.

FIG. 1 is disclosed in Korean Patent No. 10-0428242, which shows a lens assembly that includes four lenses. In FIG. 1, each of a first lens G1 and a second lens G2 is optical glass lens, and each of a third lens G3 and a fourth lens G4 is plastic lens.

In that patent, the first lens as a convex lens needs to ensure a minimum thickness at the outermost side, and the second lens as a concave lens needs to have a predetermined thickness so as to ensure a minimum thickness at a central portion thereof. That is, in consideration of a conventional process, the central thickness of the first lens needs to be 1 mm or more because the minimum thickness of the first lens at the outermost side needs to be 0.4 mm or more. The central thickness of the second lens needs to be 0.3 mm or more. In this case, the minimum central thickness that is required in the first and second lenses becomes 1.3 mm or more.

If compared with a case where an aspherical glass mold lens is used instead of the spherical glass lens, since the thickness of the glass mold lens is 0.6 mm, the optical length of the lens assembly is increased to 0.7 mm or more. Accordingly, the glass mold lens is not effective in terms of the length.

In one method of the related art, in order to decrease the optical length of a high-resolution lens assembly, only plastic lenses are used.

In above case, however, since the surface roughness of the plastic lens is larger than that of the glass lens, it is difficult to obtain a clear image due to an error of an optical path. In a general plastic lens, the surface roughness Rmax is tens of nanometers, but in a general glass lens, the surface roughness Rmax is several nanometers. If the surface roughness is accumulated, resolution of an image is lowered.

Another way in the related art for decreasing the length of a high-resolution lens assembly is using a glass mold lens. However, the glass mold lens is expensive. In the case of the glass mold lens, since a mold cost is high and a mold life span is short, manufacture costs are increased, and a manufacturing process is very complicated.

SUMMARY

The present invention provides a lens assembly that can reduce the length of an optical path while supporting high resolution (2 M pixels or more), without increasing manufacturing costs and requiring a complicated process.

According to one aspect of the present invention, there is provided a high-definition imaging lens assembly, which comprises: first, second, third, and fourth lenses that are sequentially disposed from an object along an optical axis, wherein the first lens has positive refractive power and the second lens has negative refractive power, and the first and second lenses are made of an optical glass material and are bonded to each other.

The third and fourth lenses may be made of a plastic material and are spaced each other, and at least one surface of each of the third and fourth lenses may be aspherical. A front surface of the first lens and a rear surface of the second lens may be spherical. A rear surface (bonding surface) of the first lens and a front surface (bonding surface) of the second lens may be substantially planar.

According to another aspect of the present invention, there is provided a method of manufacturing a high-definition imaging lens assembly that includes first, second, third, and fourth lenses that are sequentially disposed from an object along an optical axis, which comprises: planarizing one surface of each of the first and second lenses; bonding the planarized surfaces of the first and second lenses to each other; processing the other surfaces of the first and second lenses that are bonded to each other; and disposing the third and fourth lenses.

Additional advantages, objects and features of the invention will be set forth in part in the description which follows and in part will become apparent to those having ordinary skill in the art upon examination of the following or may be learned from practice of the invention.

BRIEF DESCRIPTION OF THE DRAWINGS

The above and other features and advantages of the present invention will be more apparent from the following detailed description taken in conjunction with the accompanying drawings, in which.

DETAILED DESCRIPTION

Figure 1:
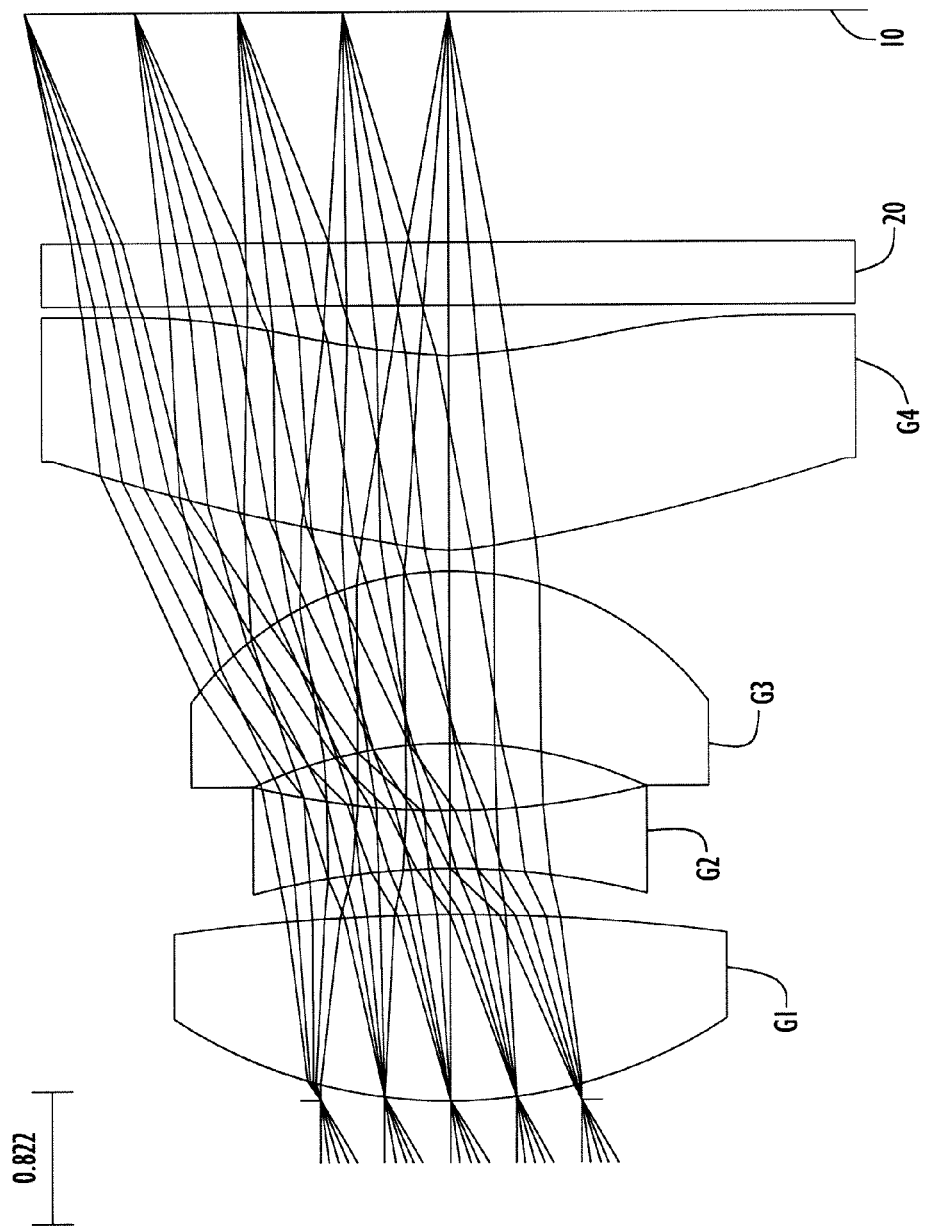
FIG. 1 is a view illustrating the related art.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across the figures.

A lens assembly according to an exemplary embodiment of the present invention includes four lenses. In the lens assembly, first and second lenses each are made of glass and are bonded to each other to reduce the length of the first and second lenses, and third and fourth lens each are made of an aspherical plastic lens.

Figure 2:
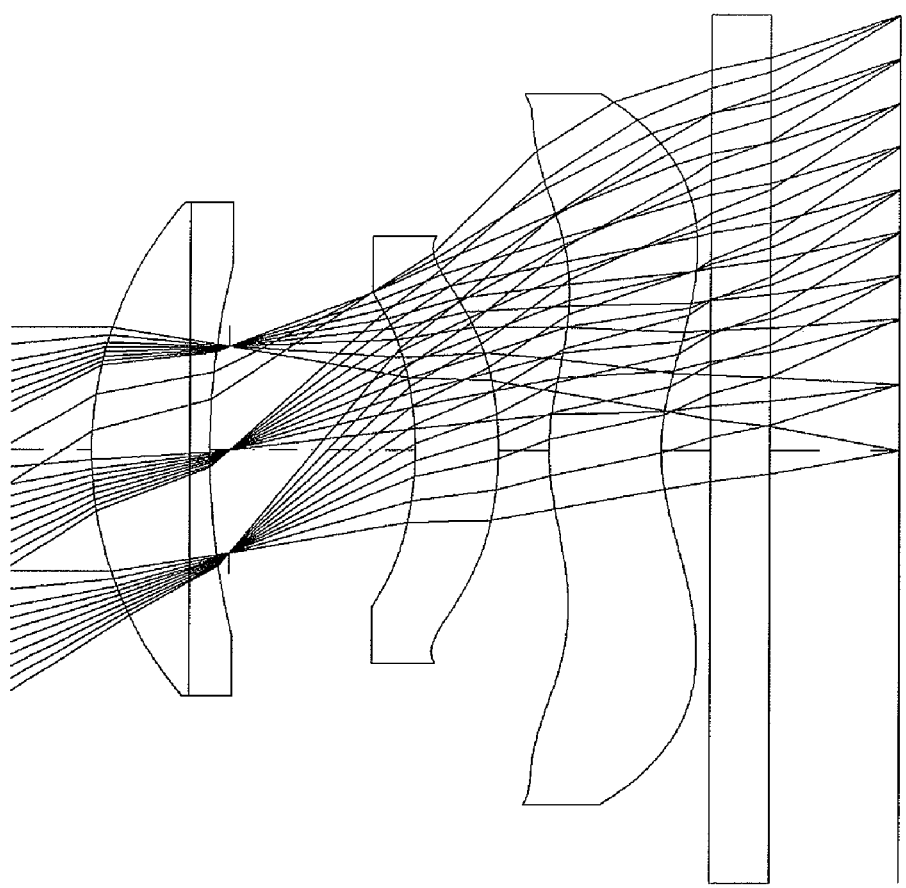
FIG. 2 is a view illustrating a subminiature and high-definition imaging lens according to an exemplary embodiment of the present invention that includes four lenses.

FIG. 2 is a view illustrating a lens assembly according to an exemplary embodiment of the present invention and an optical path thereof.

In FIG. 2, an object is located at a left side and an imaging element(e.g. CCD, CMOS) is located at a right side, and first, second, third, and fourth lenses are disposed sequentially from the left side.

As shown in FIG. 2, in the lens assembly according to the exemplary embodiment of the present invention, the first and second lenses, each of which is composed of a spherical glass lens, are bonded to each other, and each of the third and fourth lenses is composed of an aspherical plastic lens.

The thickness of the first lens at the outermost side is 0.03 mm, and the central thickness of the second lens is 0.1 mm. In present embodiment, the total central thickness of the first and second lenses is 0.6 mm.

The first and second lenses according to the exemplary embodiment of the present invention cannot be manufactured by a method according to the related art.

That is, in conventional process, the central thickness of the lens needs to be 0.2 mm or more and the thickness of the lens at the outermost side needs to be 0.3 mm or more.

In order to manufacture the lenses, according to the present invention, the first and second lenses are designed such that one surface of each of the first and second lenses is planar, and are bonded to each other at the planar sides thereof and then processed.

Figure 3:
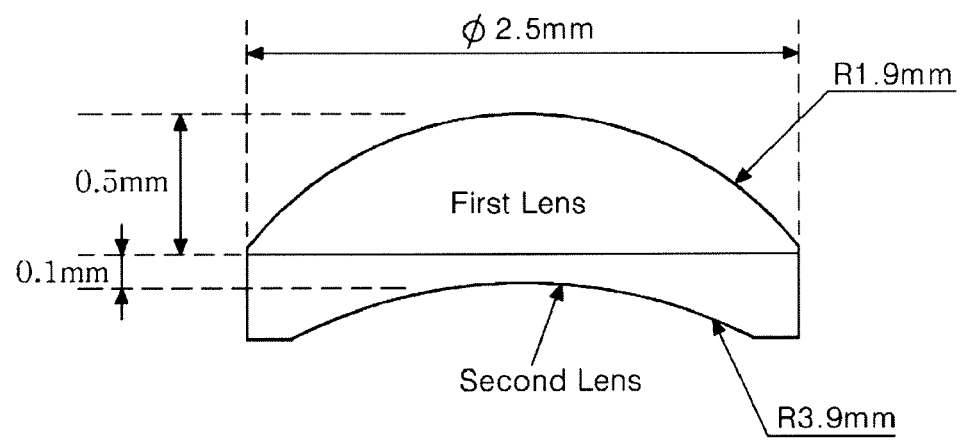
FIG. 3 is a view specifically illustrating structures of a first lens and a second lens shown in FIG. 2.

The structures of the first and second lenses according to the exemplary embodiment are shown in FIG. 3. The specifications of the first and second lenses are as follows.

First Lens

Radius of curvature at front surface: 1.9 mm, radius of curvature at rear surface: infinity, central thickness: 0.5 mm, and diameter: Φ2.5 mm Second lens Radius of curvature at front surface: infinity, radius of curvature at rear surface: 3.9 mm, central thickness: 0.1 mm, and diameter: Φ2.5 mm Table 1 shows lens data according to an exemplary embodiment of the present invention.

TABLE 1

| Surface (surface number) | RDY (radius of curvature) | THI (thickness) | Nd (refractive index) | Vd (abbe number) |
|---|---|---|---|---|
| OBJ | INFINITY | Infinity | | |
| 1 | 1.90000 | 0.500000 | 1.883 | 40.8 |
| 2 | INFINITY | 0.100000 | 1.923 | 20.9 |
| 3 | 3.90000 | 0.100000 | | |
| STO | INFINITY | 0.944813 | | |
| 5(*) | −1.73110 | 0.419073 | 1.531 | 55.8 |
| 6(*) | −1.96679 | 0.255822 | | |
| 7(*) | 1.25920 | 0.568848 | 1.531 | 55.8 |
| 8(*) | 1.12184 | 0.650000 | | |
| 9 | INFINITY | 0.300000 | 1.517 | 64.2 |
| 10 | INFINITY | 0.261445 | | |
| IMAG | INFINITY | | | |

(OBJ: object surface; STO: stop, IMG: image surface, and INFINITY in RDY means planar)

The aspherical coefficients are show in Table 2.

TABLE 2

| | | | | | |
|---|---|---|---|---|---|
| S5 | K | | | | |
| | −2.104119 | | | | |
| | A | B | C | D | E | F |
| | −.270644E−02 | −.154638E+00 | −.518016E+00 | 0.796820E+00 | 0.152296E+00 | −.270954E+00 |
| S6 | K | | | | | |
| | −6.217451 | | | | | |
| | A | B | C | D | E | F |
| | −.375272E+00 | 0.497518E+00 | −.592576E+00 | 0.164247E+00 | 0.339056E+00 | −.163195E+00 |
| S7 | K | | | | | |
| | −7.000000 | | | | | |
| | A | B | C | D | E | F |
| | −.224558E+00 | 0.547025E−01 | 0.474057E−02 | −.411883E−02 | 0.165911E−02 | −.309039E−03 |
| S8 | K | | | | | |
| | −4.232665 | | | | | |
| | A | B | C | D | E | F |
| | −.169631E+00 | 0.567504E−01 | −.165578E−01 | 0.219399E−02 | −.107957E−03 | −.185273E−05 |

An aspherical equation of the lens assembly according to the present embodiment is represented by Equation 1.

$$X(Y) = \frac{Y^2}{B} \frac{1}{1+\sqrt{1-(1+K)\cdot\left(\frac{Y}{B}\right)^2}} + A\cdot Y^4 + B\cdot Y^6 + C\cdot Y^8 + D\cdot Y^{10} + E\cdot Y^{12} + F\cdot Y^{14}$$ [Equation 1]

where X indicates a sag from an apex of the lens in an optical axial direction, Y indicates a height from the optical axis, R indicates a radius of curvature at the apex of the lens, K indicates a Conic constant, and A, B, C, D, E, and F indicate quartic, 5-th degree, 8-th degree, 10-th degree, 12-th degree, and 14-th aspherical coefficients.

According to a distribution of refractive power in the lens assembly, the first and second glass bonding lenses are responsible for most of refractive power and the third and fourth lenses serve to correct aberration. In the exemplary embodiment, the total refractive power is 0.28, refractive power of the first and second glass bonding lenses is 0.26, refractive power of the third lens is −0.01, and refractive power of the fourth lens is 0.02.

That is, the refractive power of the first and second glass bonding lenses occupies 91% of the total refractive power.

In the present invention, the stop is located between the second lens and the third lens so as to reduce sensitivity to the manufacture tolerance, while the CRA is set to 25 degrees or less and the length of the lens is decreased.

In present invention, it is possible to securely correct color aberration by forming the glass lenses using different materials. Specifically, in present invention, each of the first and second lenses is formed by using a material that has a high refractive index so as to reduce the length of the optical path of the lens assembly and a different abbe number so as to correct color aberration.

The refractive index Nd and the abbe number Vd of each of the first and second lenses in the present embodiment are as follows.

First Lens
Nd: 1.883 and Vd: 40.8
Second Lens
Nd: 1.923, and Vd: 20.9

In this case, the refractive indexes of the first and second lenses are more than 1.8, and the abbe numbers thereof are different from each other by about 20.

In the sensor according to the exemplary embodiment, an image size is 4.4 mm, F number is 2.8, CRA is 25 degrees, and TTL (length from the front surface of the lens to the image surface) is 4.1 mm.

That is, the lens has a reduced TTL while achieving high resolution.

Figure 4:
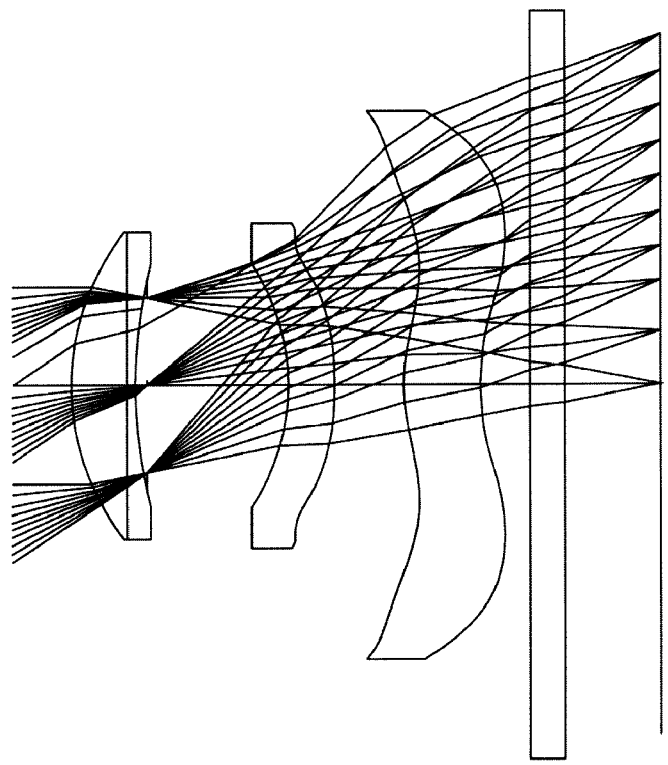
FIG. 4 is a view illustrating another exemplary embodiment of the present invention.

FIG. 4 is a view illustrating another exemplary embodiment of the present invention. Data of a lens assembly shown in FIG. 4 is represented in Tables 3 and 4.

TABLE 3

| Surface (surface number) | RDY (radius of curvature) | THI (thickness) | Nd (refractive index) | Vd (abbe number) |
|---|---|---|---|---|
| OBJ | INFINITY | INFINITY | | |
| 1 | 1.95855 | 0.470000 | 1.729 | 54.7 |
| 2 | INFINITY | 0.080000 | 1.674 | 29.4 |
| 3 | 3.92256 | 0.100000 | | |
| STO | INFINITY | 1.185543 | | |
| 5(*) | −2.32995 | 0.400033 | 1.531 | 55.8 |
| 6(*) | −3.32208 | 0.584255 | | |
| 7(*) | 1.46766 | 0.649007 | 1.531 | 55.8 |
| 8(*) | 1.36691 | 0.422187 | | |
| 9 | INFINITY | 0.300000 | 1.517 | 64.2 |
| 10 | INFINITY | 0.839223 | | |
| IMG | INFINITY | −0.029898 | | |

TABLE 4

| | | | | | |
|---|---|---|---|---|---|
| S5 | K | | | | |
| | 3.579538 | | | | |
| | A | B | C | D | E | F |
| | −.774943E−01 | −.254146E−01 | 0.295739E−01 | 0.743280E−01 | 0.289899E−02 | −.717340E−02 |
| S6 | K | | | | | |
| | 4.843109 | | | | | |

TABLE 4-continued

|    | A | B | C | D | E | F |
|----|---|---|---|---|---|---|
|    | −.227001E+00 | 0.205617E+00 | −.152980E+00 | 0.562486E−01 | 0.510150E−01 | −.260913E−01 |
| S7 | K<br>−4.381308 | | | | | |
|    | A | B | C | D | E | F |
|    | −.157213E+00 | 0.283279E−01 | 0.302304E−03 | −.522377E−03 | 0.133892E−03 | −.183062E−04 |
| S8 | K<br>−4.121284 | | | | | |
|    | A | B | C | D | E | F |
|    | −.997791E−01 | 0.212058E−01 | −.357171E−02 | 0.177067E−03 | 0.162655E−04 | −.123629E−05 |

Table 3 shows lens data, and Table 4 shows aspherical coefficients.

In another exemplary embodiment of the present invention, since the outer diameter of the first lens is Φ2.5 mm, the thickness of the first lens at the outermost side is 0.019 mm. The central thickness of the second lens is 0.08 mm.

In this embodiment, the first and second glass bonding lenses are responsible for most of refractive power and the third and fourth lenses serve to correct aberration. The total refractive power is 0.2218, refractive power of the first and second glass bonding lenses is 0.2212, refractive power of the third lens is −0.06, and refractive power of the fourth lens is 0.03.

That is, the refractive power of the first and second glass bonding lenses occupies 99.8% of the total refractive power.

In the present invention, it is possible to securely correct color aberration by forming the glass lenses using different materials. Specifically, in present invention, each of the first and second lenses is made of materials that have a high refractive index so as to reduce the length of the optical path of the lens assembly and different abbe number so as to correct color aberration.

the present embodiment are as follows.
First Lens
Nd: 1.873 and Vd: 54.7
Second Lens
Nd: 1.674, and Vd: 29.4

The refractive indexes of the first and second lenses are more than 1.65, and the abbe numbers thereof are different from each other by about 25. In the sensor according to another exemplary embodiment of the present invention, an image size is 5.7 mm, F number is 2.8, CRA is 25.2 degrees, and TTL (length from the front surface of the lens to the image surface) is 5.0 mm.

Figure 5:
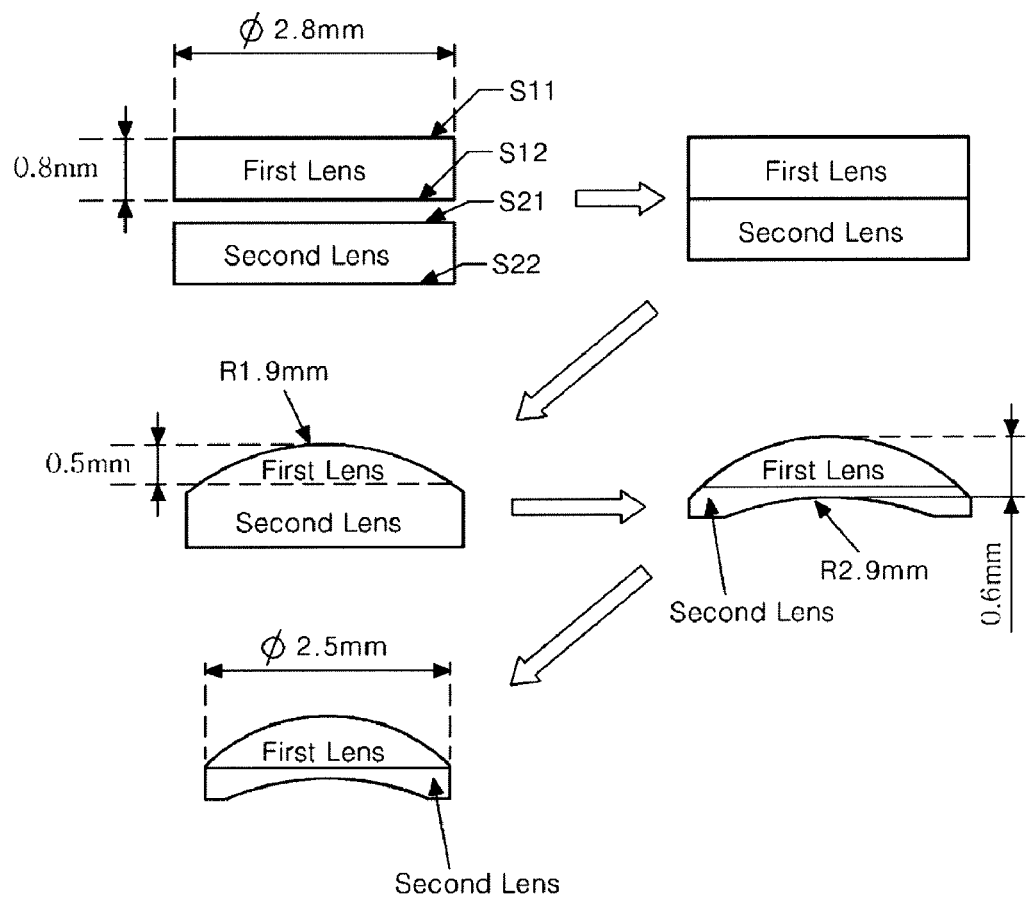
FIG. 5 is a view illustrating a manufacturing process of the present invention.

That is, the lens has a reduced TTL while achieving high resolution. FIG. 5 is a view illustrating a process of manufacturing a lens according to an exemplary embodiment of the present invention.

Referring to FIG. 5, after preparing the first and second lenses in the blank state, the two optical lenses can be processed to have the thickness as much as one optical lens by performing the following processes.

1. planarizing the rear surface S12 of the first lens and the front surface S21 of the second lens (curve generation→grinding→polishing).

2. bonding the planes S12 of the first lens and S21 of the second lens by using an ultraviolet bonding method.

3. performing a curve generating process on the front surface S11 of the first lens (curve generation→grinding→polishing).

4. performing a curve generating process on the rear surface S22 of the second lens (curve generation→grinding→polishing).

5. performing a centering process.

6. performing non-refractive coating at both surfaces.

Since the two glass lenses that are the first and second lenses of the lens assembly are bonded to each other so as to form one lens, it is possible to form the lens assembly according to the present invention.

Typically, a bonding surface has a curvature. In that case, the apexes of the surfaces of the first and second lenses in the radius of curvature cannot align each other. The phenomenon of the apexes of the surfaces of the first and second lenses in the radius of curvature not aligning each other is generally referred to as eccentricity.

However, in the present invention, since the bonding surface is designed to be a plane and the above-described processes are used, it is possible to resolve the problem due to the eccentricity.

In the exemplary embodiment of the present invention, the thickness of the first lens at the outermost side is 0.03 mm and the outer diameter of the first lens is Φ2.5 mm (when the outer diameter of the first lens is Φ2.0 mm, the thickness of the first lens at the outermost side is 0.22 mm). The central thickness of the second lens is 0.1 mm.

In conventional process, due to physical restrictions, the central thickness of the lens needs to be 0.2 mm or more and the thickness of the lens at the outermost side needs to be 0.3 mm or more. In consideration of this point, it can be understood that it is possible to drastically reduce the length of the optical path of the lens assembly in the present invention.

As described above, the lens assembly according to the present invention produces the following effect.

It is possible to provide the lens that can have high resolution and the reduced TTL while using a relatively simple process.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A high-definition imaging lens assembly, comprising:
first, second, third, and fourth lenses that are sequentially disposed from an object along an optical axis,
wherein: the first lens has positive refractive power and the second lens has negative refractive power; the first and second lenses comprise an optical glass; a front surface of the first lens and a rear surface of the second lens are spherical; and a rear surface of the first lens and a front surface of the second lens are substantially planar and bonded to each other, and wherein the third and fourth lenses comprise a plastic material and are spaced from each other, and at least one surface of each of the third and fourth lenses is aspherical.

2. The high-definition imaging lens assembly of claim 1, wherein the thickness $T1\_edge$ of the first lens at the outer side and the central thickness of the second lens $T2\_center$ satisfy the conditions of $T1\_edge<0.03$ mm and $T2\_center<0.3$ mm.

3. The high-definition imaging lens assembly of claim 1, wherein total refractive power P12 of the first and second lenses and total refractive power P of all the lenses satisfy the relation of $P12/P>0.8$.

4. The high-definition imaging lens assembly of claim 1, wherein refractive power P3 of the third lens and refractive power P4 of the fourth lens satisfy the following conditions:

$$-0.2<P3<0.2, -0.2<P4<0.2.$$

5. The high-definition imaging lens assembly of claim 1, wherein an abbe number V1 of the first lens and an abbe number V2 of the second lens satisfy the relation $|V1-V2|>15$.

6. A high-definition imaging lens assembly, comprising:
   first, second, third, and fourth lenses that are sequentially disposed from an object along an optical axis; and
   a stop that is disposed between the second lens and the third lens,
   wherein the first and second lenses comprise an optical glass, a front surface of the first lens and a rear surface of the second lens are spherical, and a rear surface of the first lens and a front surface of the second lens are substantially planar and bonded to each other, and
   wherein the third and fourth lenses comprise plastic and are spaced from each other, and at least one surface of each of the third and fourth lenses is aspherical.

7. The high-definition imaging lens assembly of claim 6, wherein the thickness $T1\_edge$ of the first lens at the outer side and the central thickness of the second lens $T2\_center$ satisfy the conditions of $T1\_edge<0.03$ mm and $T2\_center<0.3$ mm.

8. The high-definition imaging lens assembly of claim 6, wherein total refractive power P12 of the first and second lenses and total refractive power P of all the lenses satisfy the relation of $P12/P>0.8$.

9. The high-definition imaging lens assembly of claim 6, wherein refractive power P3 of the third lens and refractive power P4 of the fourth lens satisfy the following conditions:

$$-0.2<P3<0.2, -0.2<P4<0.2.$$

10. The high-definition imaging lens assembly of claim 6, wherein an abbe number V1 of the first lens and an abbe number V2 of the second lens satisfy the relation of $|V1-V2|>15$.

* * * * *